(12) United States Patent
Kishimoto et al.

(10) Patent No.: US 10,514,090 B2
(45) Date of Patent: Dec. 24, 2019

(54) TRANSMISSION

(71) Applicant: TOYOTA JIDOSHA KABUSHIKI KAISHA, Toyota-shi, Aichi-ken (JP)

(72) Inventors: Naoyuki Kishimoto, Susono (JP); Motoki Tabuchi, Mishima (JP)

(73) Assignee: TOYOTA JIDOSHA KABUSHIKI KAISHA, Toyota-shi (JP)

( * ) Notice: Subject to any disclaimer, the term of this patent is extended or adjusted under 35 U.S.C. 154(b) by 15 days.

(21) Appl. No.: 15/952,952

(22) Filed: Apr. 13, 2018

(65) Prior Publication Data
US 2018/0306307 A1 Oct. 25, 2018

(30) Foreign Application Priority Data

Apr. 20, 2017 (JP) .................................. 2017-083831

(51) Int. Cl.
*F16H 57/04* (2010.01)
*F16H 3/66* (2006.01)

(52) U.S. Cl.
CPC ..... *F16H 57/0473* (2013.01); *F16H 57/0423* (2013.01); *F16H 57/0424* (2013.01); *F16H 57/0435* (2013.01); *F16H 57/0441* (2013.01); *F16H 57/0456* (2013.01); *F16H 57/0479* (2013.01); *F16H 57/0484* (2013.01); *F16H 3/663* (2013.01); *F16H 3/666* (2013.01); *F16H 2200/006* (2013.01); *F16H 2200/0086* (2013.01); *F16H 2200/2007* (2013.01); *F16H 2200/2012* (2013.01);
(Continued)

(58) Field of Classification Search
None
See application file for complete search history.

(56) References Cited

U.S. PATENT DOCUMENTS 6,634,980 B1 * 10/2003 Ziemer ...................... F16H 3/66
475/275
2003/0224899 A1 * 12/2003 Ishimaru ................... F16H 3/66
475/275

FOREIGN PATENT DOCUMENTS

JP     S60-003353 U    1/1985
JP     H10-184858 A    7/1998
(Continued)

OTHER PUBLICATIONS

Reason for refusal JP 2017-083831 (Year: 2017).*

*Primary Examiner* — Colby M Hansen
(74) *Attorney, Agent, or Firm* — Hunton Andrews Kurth LLP

(57) ABSTRACT

A transmission includes: a plurality of annular first engagement members; a fitting member having outer teeth spline-fitted to inner teeth of the first engagement members, the fitting member being configured to be rotatable around a predetermined rotation axis; a plurality of annular second engagement members configured to be engaged with the first engagement members; a lubricating oil supply portion configured to supply a lubricating oil to the fitting member; and a transmission case configured to accommodate the first engagement members, the fitting member, the second engagement members, and the lubricating oil supply portion. The lubricating oil supply portion is provided on an inner wall of the transmission case, and a discharge portion of the lubricating oil supply portion which ejects the lubricating oil is configured to eject the lubricating oil toward a portion where the first engagement members and the fitting member are spline-fitted to each other.

6 Claims, 10 Drawing Sheets

(52) U.S. Cl.
CPC ............... *F16H 2200/2023* (2013.01); *F16H 2200/2046* (2013.01); *F16H 2200/2097* (2013.01)

(56) References Cited

FOREIGN PATENT DOCUMENTS

| JP | 2001-165196 A | 6/2001 |
| JP | 2007-056909 A | 3/2007 |
| JP | 2015-197144 A | 11/2015 |

\* cited by examiner

FIG. 3

| GEAR STAGE | C1 | C2 | C3 | C4 | B1 | B2 |
|---|---|---|---|---|---|---|
| 1st | O | | | | | O |
| 2nd | O | | | | O | |
| 3rd | O | | O | | | |
| 4th | O | | | O | | |
| 5th | O | O | | | | |
| 6th | | O | | O | | |
| 7th | | O | O | | | |
| 8th | | O | | | O | |
| Rev1 | | | O | | | O |
| Rev2 | | | | O | | O |

TRANSMISSION

INCORPORATION BY REFERENCE

The disclosure of Japanese Patent Application No. 2017-083831 filed on Apr. 20, 2017 including the specification, drawings and abstract is incorporated herein by reference in its entirety.

BACKGROUND

1. Technical Field

The present disclosure relates to a transmission provided with a friction engagement device.

2. Description of Related Art

A friction engagement device is known in which a plurality of first plates, each of which having an annular shape, and which is rotatable around a rotation axis and is arranged in an axial direction, and second plates, which are disposed between the first plates to oppose the first plates, are pressed in the axial direction for friction engagement between the first plates and the second plates is known. In Japanese Unexamined Utility Model Application Publication No. 60-3353 (JP 60-3353 U), a method is disclosed in which a radial through-hole is provided in a clutch hub of a friction engagement device and a lubricating oil is supplied from a hydraulic control device to the friction engagement device through a conduit for supplying the lubricating oil from the inner circumferential side of the clutch hub.

SUMMARY

There is a demand for a transmission having a large number of gear stages, and in order to realize a larger number of gear stages, there is a need to further dispose a planetary gear or the like radially inward of a fitting member such as a clutch hub or an engagement member such as a plate. When the planetary gear is further disposed radially inward of the engagement member, there is no space for a conduit radially inward of the engagement member. In a case where no conduit is provided, it is difficult to supply a lubricating oil to the engagement member of a friction engagement device, and there is a possibility that the lubricating oil may become insufficient. When the lubricating oil supplied to the engagement member, which is a friction member, is insufficient, the performance of cooling the engagement member deteriorates.

The disclosure provides a transmission capable of securing the performance of cooling an engagement member by suppressing insufficiency of a lubricating oil supplied to the engagement member of a friction engagement device in a transmission.

An aspect of the disclosure relates to a transmission including: a plurality of first engagement members, the first engagement member having an annular shape; a fitting member having outer teeth spline-fitted to inner teeth of the first engagement members, the fitting member being configured to be rotatable around a predetermined rotation axis of the fitting member; a plurality of second engagement members configured to be engaged with the first engagement members, the second engagement member having an annular shape; a lubricating oil supply portion configured to supply a lubricating oil to the fitting member; and a transmission case configured to accommodate the first engagement members, the fitting member, the second engagement members, and the lubricating oil supply portion. The lubricating oil supply portion is provided on an inner wall of the transmission case. A discharge portion of the lubricating oil supply portion which ejects the lubricating oil is configured to eject the lubricating oil toward a spline-fitting portion where the first engagement members and the fitting member are spline-fitted to each other.

In the transmission according to the aspect of the disclosure, the fitting member may have a cylindrical shape (in the present specification, "cylindrical shape" includes "substantially cylindrical shape" in its meaning) in which the outer teeth are provided in an outer circumference, and at least one planetary gear mechanism may be disposed radially inward of the fitting member.

Since the lubricating oil supply portion is provided on the inner wall of the transmission case, there is no need to provide a conduit for supplying the lubricating oil to the first engagement members or the second engagement members radially inward of the fitting member. Therefore, the degree of freedom of the arrangement of planetary gear mechanisms provided radially inward of the fitting member can be improved.

The transmission according to the aspect of the disclosure may further include an electronic control unit configured to control supply of the lubricating oil by the lubricating oil supply portion. In the spline-fitted portion of the first engagement member, a portion of the inner teeth of the first engagement member may have a toothless region. The electronic control unit may be configured to cause the lubricating oil supply portion to eject the lubricating oil to at least the toothless region through the discharge portion.

With the configuration, the lubricating oil can be allowed to efficiently flow between the first engagement member and the fitting member through the toothless region, and thus the performance of cooling the first engagement member or the second engagement member can be further improved.

In the transmission according to the aspect of the disclosure, a plurality of the toothless regions may be disposed in the first engagement members such that the toothless regions are arranged along a direction of the predetermined rotation axis of the fitting member.

With the configuration, the lubricating oil can be efficiently distributed to the first engagement member and the second engagement member at a position far from the discharge portion, and thus the amount of the lubricating oil used for lubrication and cooling can be further reduced.

In the transmission according to the aspect of the disclosure, the first engagement members may include close first engagement members close to the lubricating oil supply portion and far first engagement members farther from the lubricating oil supply portion than the first engagement members, and the number of toothless regions included in the close first engagement members may be larger than the number of toothless regions included in the far first engagement members.

The transmission according to the aspect of the disclosure may further include an electronic control unit configured to control supply of the lubricating oil by the lubricating oil supply portion. The electronic control unit may be configured to cause the lubricating oil supply portion to eject the lubricating oil through the discharge portion while the first engagement members and the second engagement members are in a semi-engaged state and after the semi-engaged state.

With the configuration, in a case where there is a need to cool the friction engagement device the most, the lubricating oil can be efficiently supplied thereto. Therefore, the lubricating oil is not always supplied, and thus the amount of the lubricating oil used for lubrication and cooling can be further reduced.

With the transmission according to the aspect of the disclosure, since the discharge portion that ejects the lubricating oil is provided radially outward of the fitting member and the lubricating oil is ejected toward the space between the first engagement member and the fitting member from the outer circumferential side of the fitting member, a needed amount of the lubricating oil for the engagement members of the friction engagement device can be supplied without providing a conduit for supplying the lubricating oil toward the inner circumferential side of the fitting member. Therefore, it is possible to suppress the insufficiency of the lubricating oil and secure the performance of cooling the engagement members.

BRIEF DESCRIPTION OF THE DRAWINGS

Features, advantages, and technical and industrial significance of exemplary embodiments will be described below with reference to the accompanying drawings, in which like numerals denote like elements, and wherein:

FIG. 3 is a table showing operation states of clutches and brakes when a drive position is selected;

DETAILED DESCRIPTION OF EMBODIMENTS

Figure 1:
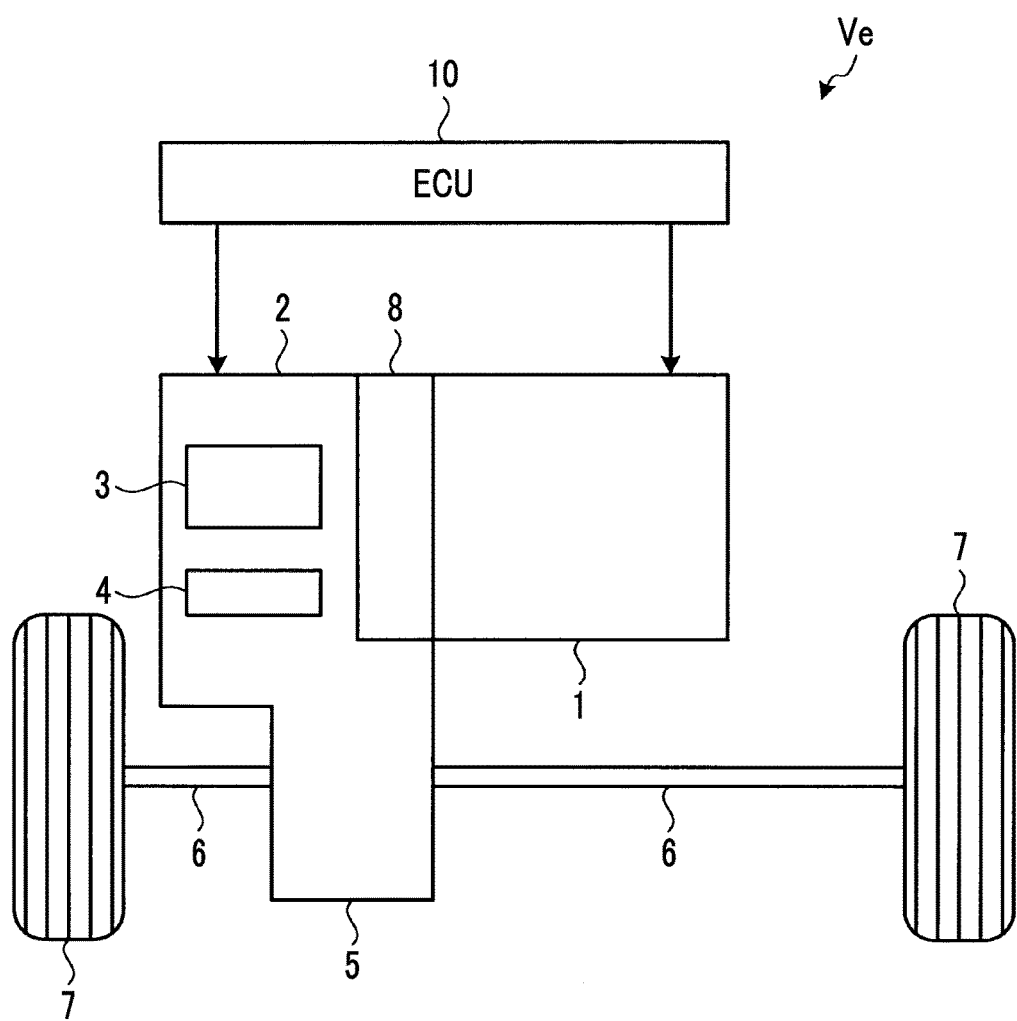
FIG. 1 is a schematic configuration diagram illustrating a powertrain in a vehicle according to an embodiment.

Hereinafter, embodiments will be described with reference to the drawings. In all the drawings of the following embodiments, like reference numerals denote like or corresponding elements.

First, a configuration of a vehicle provided with a transmission according to an embodiment will be described. FIG. 1 is a schematic configuration diagram illustrating a powertrain in the vehicle according to the embodiment. A vehicle Ve according to the embodiment is, for example, a front engine front drive (FF) vehicle having a stepped automatic transmission mounted therein. The vehicle Ve may not be the FF vehicle.

The powertrain of the vehicle Ve includes an engine 1, an automatic transmission 2, a planetary gear unit 3, a hydraulic control circuit 4, a differential gear 5, a drive shaft 6, wheels 7, and an electronic control unit (ECU) 10. The planetary gear unit 3 and the hydraulic control circuit 4 each constitute a part of the automatic transmission 2. The engine 1 and the automatic transmission 2 are connected via a torque converter 8.

The engine 1 is a power unit that burns fuel and outputs power. As the engine 1, an internal combustion engine such as a gasoline engine, a diesel engine, or an LPG engine can be used. A piston in a cylinder is pressed by combustion such that a crankshaft is rotated. The automatic transmission 2 converts the rotational speed of the crankshaft into a desired rotational speed by forming a desired gear stage. The output gear of the automatic transmission 2 meshes with the differential gear 5. The drive shaft 6 is connected to the differential gear 5 by spline fitting or the like. The output of the engine 1 is transmitted as power to the right and left wheels 7 via the drive shaft 6.

Various sensors (not illustrated) are connected to the ECU 10 as the electronic control unit via harnesses or the like. Based on signals supplied from the sensors and maps and programs stored in a read only memory (ROM), the ECU 10 controls devices such as the engine 1 and the automatic transmission 2 so that the vehicle Ve is in a desired state. The automatic transmission 2 is a stepped transmission capable of changing the ratio between an input rotational speed and an output rotational speed, that is, a gear ratio, in a discontinuous and stepwise manner. The ECU 10 controls the automatic transmission 2 such that any gear stage among gear stages (gear ratios) of first to eighth gears is formed during traveling of the vehicle Ve. By forming any gear stage among the gear stages of the first to eighth gears, the automatic transmission 2 transmits drive power to the wheels 7. The gear stages are not limited to the first to eighth gears.

Figure 2:
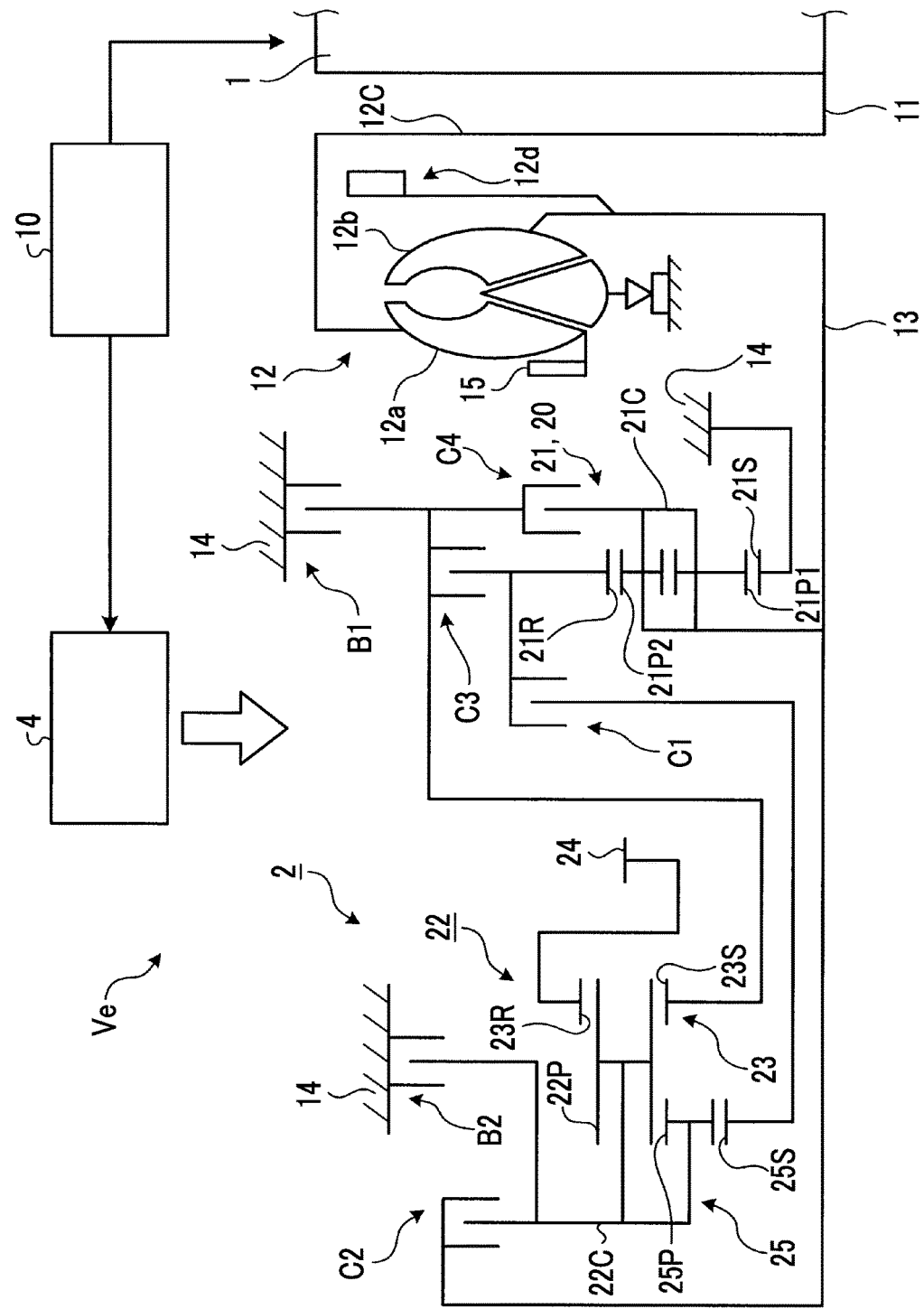
FIG. 2 is a skeleton diagram illustrating the configuration of the vehicle according to the embodiment.

FIG. 2 is a skeleton diagram illustrating the configuration of the vehicle Ve according to the embodiment. As illustrated in FIG. 2, the engine 1 is configured to convert thermal energy generated by the combustion of the fuel into the rotational motion of a crankshaft 11. In the engine 1, a torque converter 12 capable of transmitting power to the crankshaft 11 is provided. The torque converter 12 is a device capable of transmitting power by the kinetic energy of a fluid.

The torque converter 12 has a pump impeller 12a and a turbine runner 12b. A mechanical oil pump 15 for generating a hydraulic pressure is connected to the pump impeller 12a. An oil pump 15 is a pump for controlling gear shifting of the automatic transmission 2 and supplying a lubricating oil to each part of the power transmission path of the automatic transmission 2.

An input shaft 13 is disposed coaxially with the crankshaft 11, and the automatic transmission 2 is provided on the power transmission path from the crankshaft 11 to the wheel 7. The automatic transmission 2 is provided in a hollow casing 14. The automatic transmission 2 according to the embodiment has a first shifting section 20 constituted by a first planetary gear mechanism 21, and a second shifting section 22 constituted by a second planetary gear mechanism 23 and a third planetary gear mechanism 25.

The first shifting section 20 constitutes an auxiliary shifting section and is formed by the double pinion type first planetary gear mechanism 21. The first planetary gear mechanism 21 has a first sun gear 21S as outer teeth, and a first ring gear 21R, pinion gears 21P1, 21P2, and a carrier 21C as inner teeth. The first sun gear 21S and the first ring gear 21R are disposed coaxially with each other. The pinion gear 21P1 meshes with the first sun gear 21S and the pinion gear 21P2, and the pinion gear 21P2 meshes with the first ring gear 21R and the pinion gear 21P1. The carrier 21C supports the two types of pinion gears 21P1, 21P2 such that the pinion gears 21P1, 21P2 can rotate on their axes and revolve integrally. The first planetary gear mechanism 21 has three rotating elements connected to rotate at different speeds, that is, the first sun gear 21S, the first ring gear 21R, and the carrier 21C. The first sun gear 21S is fixed to the casing 14 in a state in which the first sun gear 21S does not rotate.

The second shifting section 22 is disposed radially outward of the input shaft 13. The second shifting section 22 constitutes a main shifting section and is constituted by a plurality of sets of planetary gear mechanisms. The second planetary gear mechanism 23 constituting a part of the second shifting section 22 has a second sun gear 23S, a second ring gear 23R, a long pinion gear 22P, and a carrier 22C. The second sun gear 23S and the second ring gear 23R are disposed coaxially with each other. The long pinion gear 22P meshes with the second sun gear 23S and the second ring gear 23R. The carrier 22C supports the long pinion gear 22P such that the long pinion gear 22P can rotate on its axis and revolve. The second planetary gear mechanism 23 has three rotating elements connected to rotate at different speeds, that is, the second sun gear 23S, the second ring gear 23R, and the carrier 22C. An output gear 24 that rotates integrally with the second ring gear 23R is provided. The wheel 7 is connected to the output gear 24 such that power can be transmitted.

The third planetary gear mechanism 25 constituting a part of the second shifting section 22 has a third sun gear 25S, a short pinion gear 25P, and the carrier 22C. The third sun gear 25S is disposed coaxially with the second sun gear 23S and has a smaller number of teeth than the second sun gear 23S. The short pinion gear 25P meshes with the third sun gear 25S and the long pinion gear 22P. The carrier 22C supports the long pinion gear 22P and the short pinion gear 25P such that the long pinion gear 22P and the short pinion gear 25P can rotate on their axes and revolve integrally. That is, the carrier 22C of the second shifting section 22 is shared by the second planetary gear mechanism 23 and the third planetary gear mechanism 25. The second shifting section 22 is a Ravigneaux type planetary gear mechanism constituted by the second planetary gear mechanism 23 and the third planetary gear mechanism 25.

Clutches as engagement elements that connect and disconnect the rotating elements included in the first planetary gear mechanism 21, the second planetary gear mechanism 23, and the third planetary gear mechanism 25, and brakes as engagement elements that selectively stop and fix the rotating elements will be described. As the clutches, a first clutch C1, a second clutch C2, a third clutch C3, and a fourth clutch C4 are provided, and as the brakes, a first brake B1 and a second brake B2 are provided.

The first clutch C1 selectively connects or disconnects the first ring gear 21R and the third sun gear 25S. The second clutch C2 selectively connects or disconnects the carrier 22C and the input shaft 13. The third clutch C3 selectively connects or disconnects the first ring gear 21R and the second sun gear 23S. The fourth clutch C4 selectively connects or disconnects the carrier 21C and the second sun gear 23S. The first brake B1 stops the second sun gear 23S. The second brake B2 stops the carrier 22C.

In a case where the first to fourth clutches C1 to C4 and the first and second brakes B1, B2 described above (hereinafter, simply referred to as clutches C, brakes B, or an engagement device unless otherwise particularly distinguished) are hydraulic type friction engagement devices. The clutch C or the brake B is formed by a wet multiple plate type clutch or brake pressed by a hydraulic actuator. The torque capacity (that is, engagement force) of each of the clutch C and the brake B formed as described above is changed by the hydraulic control circuit 4 such that engagement and disengagement are switched.

The hydraulic control circuit 4 is provided as an actuator that separately controls hydraulic pressures exerted on the wet multiple plate clutch and the wet multiple plate brake. The hydraulic control circuit 4 is a known hydraulic control circuit having an oil passage, a pressure control valve, an oil passage switching valve, and the like.

On the other hand, it is possible to select a parking (P) position, a reverse (R) position, a neutral (N) position, and a drive (D) position by operating a shift position selection device (not shown) provided in the cabin of the vehicle Ve. When a shift position is switched, control to cause the first to fourth clutches C1 to C4 and the first and second brakes B1, B2 described above to be in an engaged state or in a disengaged state is performed. In a case where the parking position is selected or in a case where the neutral position is selected, all the brakes B and the clutches C are disengaged such that power transmission between the input shaft 13 and the output gear 24 is interrupted. The parking position and the neutral position are non-driving positions.

On the other hand, in a case where the drive position or the reverse position is selected, the input shaft 13 and the output gear 24 are connected so as to transmit power. The drive position and the reverse position are driving positions. The ECU 10 stores a shift map to control the gear stages of the automatic transmission 2, and in the drive position, performs control to select the gear stage of the automatic transmission 2 based on the shift map and switch between the gear stages. The shift map defines a region for selecting each gear stage using a vehicle speed and an accelerator operation amount as parameters. Specifically, as the gear stages of the automatic transmission 2, regions for selecting first gear (1st), second gear (2nd), third gear (3rd), fourth gear (4th), fifth gear (5th), sixth gear (6th), seventh gear (7th), eighth gear (8th), a first reverse position (Rev1), and a second reverse position (Rev2) are defined, and upshifting and downshifting are performed by the automatic transmission 2 using the shift map.

FIG. 3 is an engagement table showing operation states of the clutches C and the brakes B when the drive position is selected. In FIG. 3, the mark "O" means that the clutch C or the brake B is engaged. In the embodiment, hydraulic chambers (not shown in FIG. 2) are respectively provided for all of the clutches C and the brakes B, and the hydraulic pressure of the oil supplied to each hydraulic chamber is controlled such that the clutch and the brake are engaged or disengaged. For example, in FIG. 3, in a case where first gear is selected, the first clutch C1 and the second brake B2 are engaged. The clutches and the brakes other than the brake and the clutch engaged with each other are disengaged.

Figure 4:
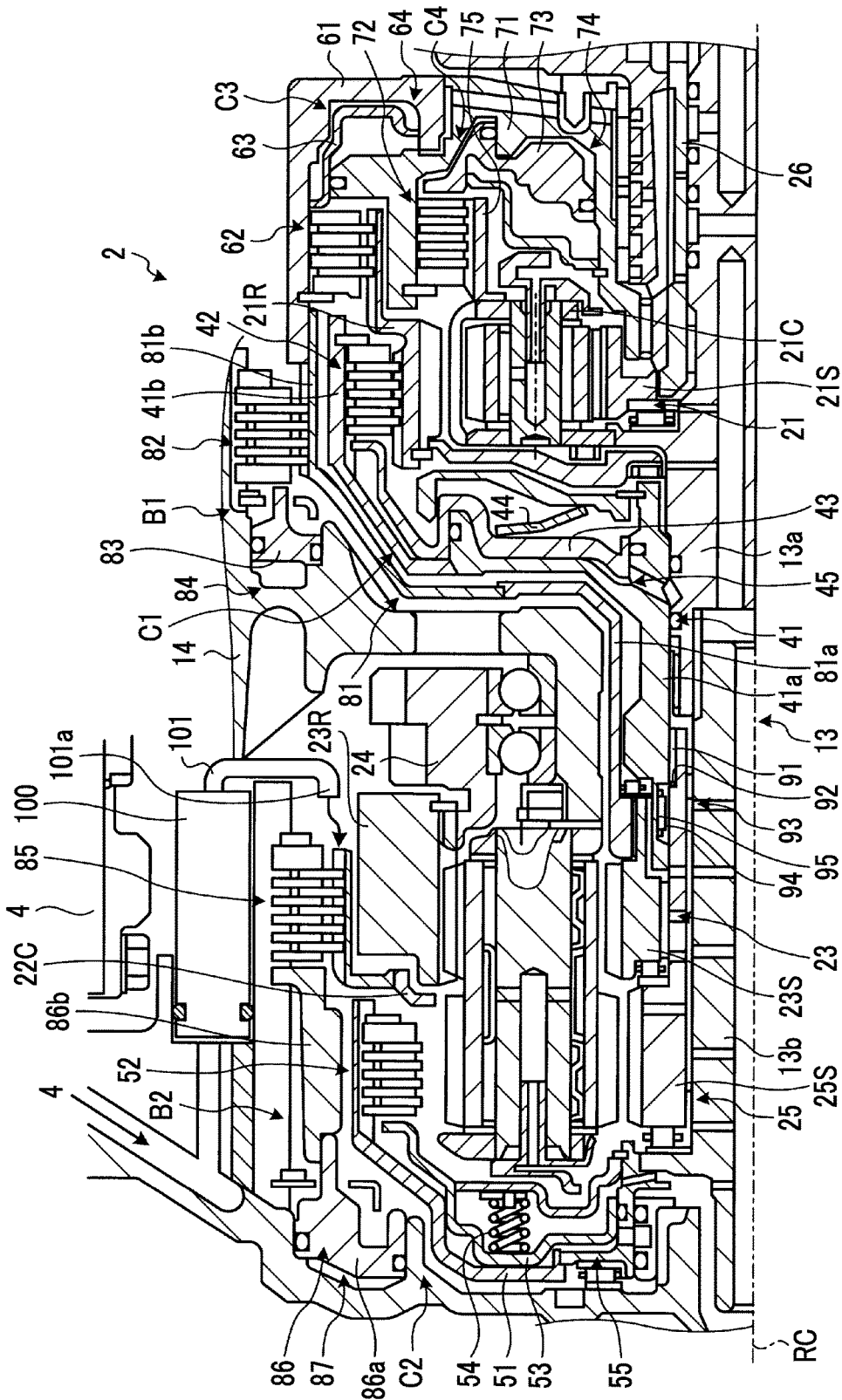
FIG. 4 is a sectional view illustrating an automatic transmission in the vehicle illustrated in FIGS. 1 and 2.

FIG. 4 is a sectional view of the automatic transmission 2 illustrated in FIGS. 1 and 2. The automatic transmission 2 is configured to accommodate, in the casing 14 as a transmission case which is a non-rotating member, the input shaft 13, the output gear 24, the first planetary gear mechanism 21, the second planetary gear mechanism 23, the third planetary gear mechanism 25, the first to fourth clutches C1 to C4, and the first and second brakes B1, B2. Since the input shaft 13, the first, second, and third planetary gear mechanisms 21, 23, 25, the first to fourth clutches C1 to C4, and the first and second brakes B1, B2 are configured to be substantially symmetrical with respect to a predetermined rotation axis RC, the lower half from the rotation axis RC is omitted in FIG. 4.

The input shaft 13 is disposed so as to be rotatable around the rotation axis RC. The input shaft 13 is constituted by a first rotating shaft 13a disposed on the torque converter 12 side in the direction of the rotation axis RC, and a second rotating shaft 13b of which one end portion in the direction of the rotation axis RC is spline-fitted to the first rotating shaft 13a to rotate integrally with the first rotating shaft 13a. An end portion of the first rotating shaft 13a on the torque converter 12 side in the direction of the rotation axis RC is connected to the turbine runner 12b of the torque converter 12 so as to transmit power.

The first planetary gear mechanism 21, the output gear 24, the second planetary gear mechanism 23, and the third planetary gear mechanism 25 are disposed in this order from the torque converter 12 side (the right side in FIG. 4) in the direction of the rotation axis RC.

The first planetary gear mechanism 21 is formed of a double pinion type planetary gear mechanism. The first sun gear 21S of the first planetary gear mechanism 21 is connected to an intermediate member 26 disposed on the outer circumference of the first rotating shaft 13a. The intermediate member 26 is connected to the casing 14 which is a non-rotating member. Accordingly, the first sun gear 21S is held so as not to be rotatable. The carrier 21C is connected to the fourth clutch C4. The first ring gear 21R is formed in an annular shape, and the outer circumferential portion of the first ring gear 21R is provided with a friction engagement element 42 of the first clutch C1 and a friction engagement element 62 of the third clutch C3.

The second sun gear 23S of the second planetary gear mechanism 23 is spline-fitted to the end portion of a small diameter portion 81a formed in a connecting drum 81 in a cylindrical shape. The third sun gear 25S of the third planetary gear mechanism 25 is formed in a substantially cylindrical shape and the end portion thereof on the torque converter 12 side in the direction of the rotation axis RC is spline-fitted to a small diameter portion 41a of a clutch drum 41.

The carrier 22C common to the second planetary gear mechanism 23 and the third planetary gear mechanism 25 supports the long pinion gear 22P and the short pinion gear 25P such that the long pinion gear 22P and the short pinion gear 25P can rotate on their axes and revolve. The outer circumferential portion of the carrier 22C is provided with a friction engagement element 52 of the second clutch C2 and a friction engagement element 85 of the second brake B2, which will be described later. In FIG. 4, although the carrier 22C on the inner circumferential side of the friction engagement element 52 of the second clutch C2 is not described, the carrier 22C is disposed in another phase in the circumferential direction. That is, on the inner circumferential side of the friction engagement element 85, at least one planetary gear mechanism, that is, in the embodiment, two planetary gear mechanisms including the second planetary gear mechanism 23 and the third planetary gear mechanism 25 are provided. The second ring gear 23R common to the second planetary gear mechanism 23 and the third planetary gear mechanism 25 is formed in an annular shape, and the inner circumferential portion of the second ring gear 23R is spline-fitted to the output gear 24 as a transmission output shaft.

Spline teeth 91 are formed on the outer circumferential surface of the torque converter 12 side (the right side in FIG. 4) of the third sun gear 25S in the direction of the rotation axis RC. Spline teeth 92 are formed on the inner circumferential surface of a portion of the clutch drum 41 which overlaps the spline teeth 91 of the third sun gear 25S when viewed in a radial direction. As the spline teeth 91 of the third sun gear 25S and the spline teeth 92 of the clutch drum 41 are spline-fitted to each other, a spline fitting portion 93, which connects the third sun gear 25S and the clutch drum 41 so as not to rotate relative to each other although relative rotation therebetween by a play is generated and so as to be movable relative to each other in the direction of the rotation axis RC, is formed. At a position adjacent to the position where the spline teeth 91, 92 constituting the spline fitting portion 93 mesh with each other in the direction of the rotation axis RC (that is, a portion different from the spline fitting portion 93), between portions where the third sun gear 25S and the clutch drum 41 overlap when viewed in the radial direction, a tolerance ring 94 is disposed in contact with both the third sun gear 25S and the clutch drum 41. An annular groove 95 is formed on the inner circumferential surface of the clutch drum 41, and the tolerance ring 94 is disposed in an annular space formed by the annular groove 95.

Specifically, in the embodiment, the first to fourth clutches C1 to C4 are wet multiple plate clutches. The multiple plate clutch has a plurality of annular discs and a plurality of annular plates arranged along the direction of the rotation axis of the input shaft 13. Friction materials are attached to both end surfaces of each of the annular disc and the annular plate. In an engaged state of the multiple plate clutch, a pressing force is applied to the annular discs and the annular plates along the direction of the rotation axis of the input shaft 13, and power is transmitted by the frictional force. The multiple plate clutch is a wet type, and the multiple plate clutch is cooled and lubricated by the lubricating oil supplied to or sealed in the casing 14. The first brake B1 and the second brake B2 are friction clutches and are formed using wet multiple plate brakes. The multiple plate brake has a plurality of annular discs and a plurality of annular plates arranged in a direction along the axial line of the direction of the rotation axis of the input shaft 13. The multiple plate brake is a brake that generates a braking force by the frictional force by applying a pressing force to the discs and the plates in the direction along the axial line. The multiple plate brake is a wet type, and the multiple plate brake is cooled and lubricated by the lubricating oil supplied to or sealed in the casing 14. That is, each of the first to fourth clutches C1 to C4 and the first and second brakes B1, B2 has substantially the same structure as the friction engagement device. Details of the friction engagement device forming the first to fourth clutches C1 to C4 and the first and second brakes B1, B2 and details of the supply of the lubricating oil will be described later.

The first clutch C1 is configured to include the clutch drum 41, the friction engagement element 42, a piston 43, a spring 44, and a hydraulic chamber 45. The friction engagement element 42 is provided between the clutch drum 41 and the first ring gear 21R. The piston 43 is provided to press the friction engagement element 42. The spring 44 is provided to bias the piston 43 in a direction away from the friction engagement element 42 in the direction of the rotation axis RC. The hydraulic chamber 45 is an oil-tight space surrounded by the piston 43 and the clutch drum 41, and hydraulic oil is supplied thereto from the hydraulic control circuit 4.

The clutch drum 41 is formed of a cylindrical member in which the small diameter portion 41a and a large diameter portion 41b are formed, and is disposed so as to be rotatable around the rotation axis RC. The friction engagement element 42 constituted by a plurality of friction plates is provided between the inner circumferential surface of the large diameter portion 41b of the clutch drum 41 and the outer circumferential surface of the first ring gear 21R. The piston 43 has a pressing portion formed at a position adjacent to the friction engagement element 62 along the direction of the rotation axis RC. The piston 43 presses the friction engagement element 42 by moving toward the friction engagement element 62 along the direction of the rotation axis RC such that the first clutch C1 enters an engaged state or a slip engaged state (semi-engaged state). When the first clutch C1 enters the engaged state, the clutch drum 41 and the first ring gear 21R are connected to each other. The piston 43 is controlled by the hydraulic pressure supplied to the hydraulic chamber 45.

The second clutch C2 is configured to include a clutch drum 51, the friction engagement element 52, a piston 53, a spring 54, and a hydraulic chamber 55. The friction engagement element 52 is provided between the clutch drum 51 and the carrier 22C. The piston 53 is provided to press the friction engagement element 52. The spring 54 is provided to bias the piston 53 in a direction away from the friction engagement element 52 in the direction of the rotation axis RC. The hydraulic chamber 55 is an oil-tight space surrounded by the piston 53 and the clutch drum 51, and hydraulic oil is supplied thereto from the hydraulic control circuit 4.

The clutch drum 51 is member formed in a cylindrical shape with a bottom, and is disposed so as to be rotatable around the rotation axis RC. The friction engagement element 52 is constituted by a plurality of friction plates and is provided between the inner circumferential surface of the clutch drum 51 and the outer circumferential surface (not illustrated in FIG. 4) of the carrier 22C. The piston 53 has a pressing portion formed at a position adjacent to the friction engagement element 52 along the direction of the rotation axis RC. The piston 53 presses the friction engagement element 52 by moving toward the friction engagement element 52 along the direction of the rotation axis RC such that the second clutch C2 enters an engaged state or a semi-engaged state. When the second clutch C2 enters the engaged state, the clutch drum 51 and the carrier 22C are connected to each other. The piston 53 is controlled by the hydraulic pressure supplied to the hydraulic chamber 55.

The third clutch C3 is configured to include a clutch drum 61, the friction engagement element 62, a piston 63, a hydraulic chamber 64, and a spring (not illustrated). The friction engagement element 62 is provided between the outer circumferential surface of the first ring gear 21R and the inner circumferential surface of the clutch drum 61. The piston 63 is provided to press the friction engagement element 62. The spring (not illustrated) is provided to bias the piston 63 in a direction away from the friction engagement element 62 in the direction of the rotation axis RC. The hydraulic chamber 64 is an oil-tight space surrounded by the piston 63 and the clutch drum 61, and hydraulic oil is supplied thereto from the hydraulic control circuit 4.

The clutch drum 61 is member formed in a cylindrical shape with a bottom, and is disposed so as to be rotatable around the rotation axis RC. The friction engagement element 62 is constituted by a plurality of friction plates and is provided between the inner circumferential surface of a cylindrical portion of the clutch drum 61 and the outer circumferential surface of the first ring gear 21R. The piston 63 has a pressing portion provided at a position adjacent to the friction engagement element 62 in the direction of the rotation axis RC. The piston 63 presses the friction engagement element 62 by moving toward the friction engagement element 62 along the direction of the rotation axis RC such that the third clutch C3 enters an engaged state or a semi-engaged state. When the third clutch C3 enters the engaged state, the clutch drum 61 and the first ring gear 21R are connected to each other. The piston 63 is controlled by the hydraulic pressure supplied to the hydraulic chamber 64.

The fourth clutch C4 is configured to include a clutch drum 71, a friction engagement element 72, a piston 73, a hydraulic chamber 74, and a spring (not illustrated). The friction engagement element 72 is provided between the clutch drum 71 and the carrier 21C. The piston 73 is provided to press the friction engagement element 72. The spring (not illustrated) is provided to bias the piston 73 in a direction away from the friction engagement element 72 in the direction of the rotation axis RC. The hydraulic chamber 74 is an oil-tight space surrounded by the piston 73 and the clutch drum 71, and hydraulic oil is supplied thereto from the hydraulic control circuit 4.

The clutch drum 71 is member formed in a double bottomed cylindrical shape, and is disposed so as to be rotatable around the rotation axis RC. The friction engagement element 72 is constituted by a plurality of friction plates and is provided between the cylindrical portion of the outer circumferential side of the clutch drum 71 and a cylindrical member 75 connected to the carrier 21C. The piston 73 has a pressing portion provided at a position adjacent to the friction engagement element 72 along the direction of the rotation axis RC. The piston 73 presses the friction engagement element 72 by moving toward the friction engagement element 72 in the direction of the rotation axis RC such that the fourth clutch C4 enters an engaged state or a semi-engaged state. When the fourth clutch C4 enters the engaged state, the carrier 21C and the clutch drum 71 are connected to each other. The piston 73 is controlled by the hydraulic pressure supplied to the hydraulic chamber 74.

The first brake B1 is configured to include the connecting drum 81, a friction engagement element 82, a piston 83, a hydraulic chamber 84, and a spring (not illustrated). The connecting drum 81 is connected to the clutch drum 61. The friction engagement element 82 is provided between the casing 14 and the connecting drum 81. The piston 83 is provided to press the friction engagement element 82. The spring (not illustrated) is provided to bias the piston 83 in a direction away from the friction engagement element 82 along the direction of the rotation axis RC. The hydraulic chamber 84 is an oil-tight space surrounded by the casing 14 and the piston 83, and hydraulic oil is supplied thereto from the hydraulic control circuit 4.

The connecting drum 81 is formed of a cylindrical member in which the small diameter portion 81a and a large diameter portion 81b are formed, and is disposed so as to be rotatable around the rotation axis RC. The friction engagement element 82 is constituted by a plurality of friction plates and is provided between the outer circumferential surface of the large diameter portion 81b of the connecting drum 81 and the inner wall surface of the casing 14. The piston 83 has a pressing portion provided at a position adjacent to the friction engagement element 82 in the direction of the rotation axis RC. The piston 83 presses the friction engagement element 82 by moving toward the friction engagement element 82 along the direction of the rotation axis RC such that the first brake B1 enters an engaged state or a semi-engaged state. When the first brake B1 is engaged, the connecting drum 81 and the casing 14 are connected to each other such that rotation of the connecting drum 81 is stopped. The piston 83 is controlled by the hydraulic pressure supplied to the hydraulic chamber 84.

The second brake B2 as the friction engagement device is configured to include the friction engagement element 85, a piston 86, a hydraulic chamber 87, a lubrication switching valve 100, and a spring (not illustrated). The friction engagement element 85 is provided between the outer circumferential surface of the carrier 22C and the inner wall surface of the casing 14. The piston 86 as a pressing member is provided to press the friction engagement element 85. The spring (not illustrated) is provided to bias the piston 86 in a direction away from the friction engagement element 85 along the direction of the rotation axis RC. The hydraulic chamber 87 is an oil-tight space surrounded by the piston 86 and the casing 14, and hydraulic oil is supplied thereto from the hydraulic control circuit 4.

The friction engagement element 85 is constituted by a plurality of friction plates and is provided between the outer circumferential surface of the carrier 22C and the inner wall surface of the casing 14. The piston 86 is constituted by a piston body 86a and an extension 86b as a pressing member. The extension 86b has a pressing portion provided at a position adjacent to the friction engagement element 85 along the direction of the rotation axis RC. The piston 86 presses the friction engagement element 85 by moving toward the friction engagement element 85 along the direction of the rotation axis RC such that the second brake B2 enters an engaged state or a semi-engaged state. When the second brake B2 enters the engaged state, the carrier 22C and the casing 14 are connected to each other such that rotation of the carrier 22C is stopped. The piston 86 is controlled by the hydraulic pressure supplied to the hydraulic chamber 87.

The lubrication switching valve 100 as a lubricating oil supply portion is provided in the inner wall portion of the casing 14 radially outward of the friction engagement element 85 in the second brake B2. The lubrication switching valve 100 is configured to switch between discharge and stop of the lubricating oil supplied from the hydraulic control circuit 4. As the lubrication switching valve 100, a hydraulic on-off valve that opens and closes the valve in response to the hydraulic pressure (engagement hydraulic pressure) of the lubricating oil supplied from the hydraulic control circuit 4 or the like can be used. A discharge nozzle 101 is provided in communication with the discharge side of the lubricating oil in the lubrication switching valve 100. The discharge nozzle 101 is formed, for example, in a substantially U-shape and is configured to eject the lubricating oil supplied from the hydraulic control circuit 4 through the lubrication switching valve 100 toward the friction engagement element 85 of the second brake B2. A discharge portion 101a of the discharge nozzle 101 is disposed, for example, at a position opposing the piston 86 with the friction plates constituting the friction engagement element 85 interposed therebetween, that is, at a position opposing the surface of the friction plates constituting the friction engagement element 85.

Figure 7:
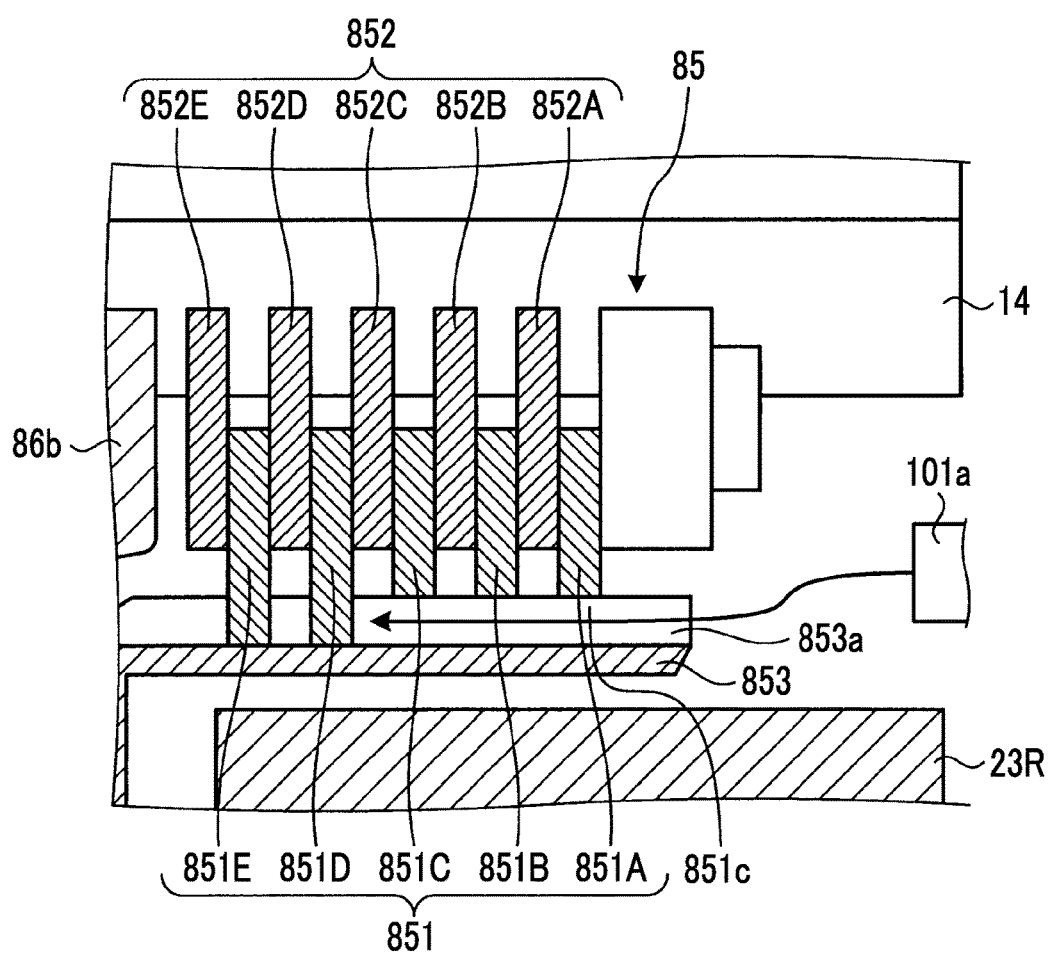
FIG. 7 is an enlarged sectional view of the friction engagement element included in the friction engagement device according to the embodiment.
Figure 8:
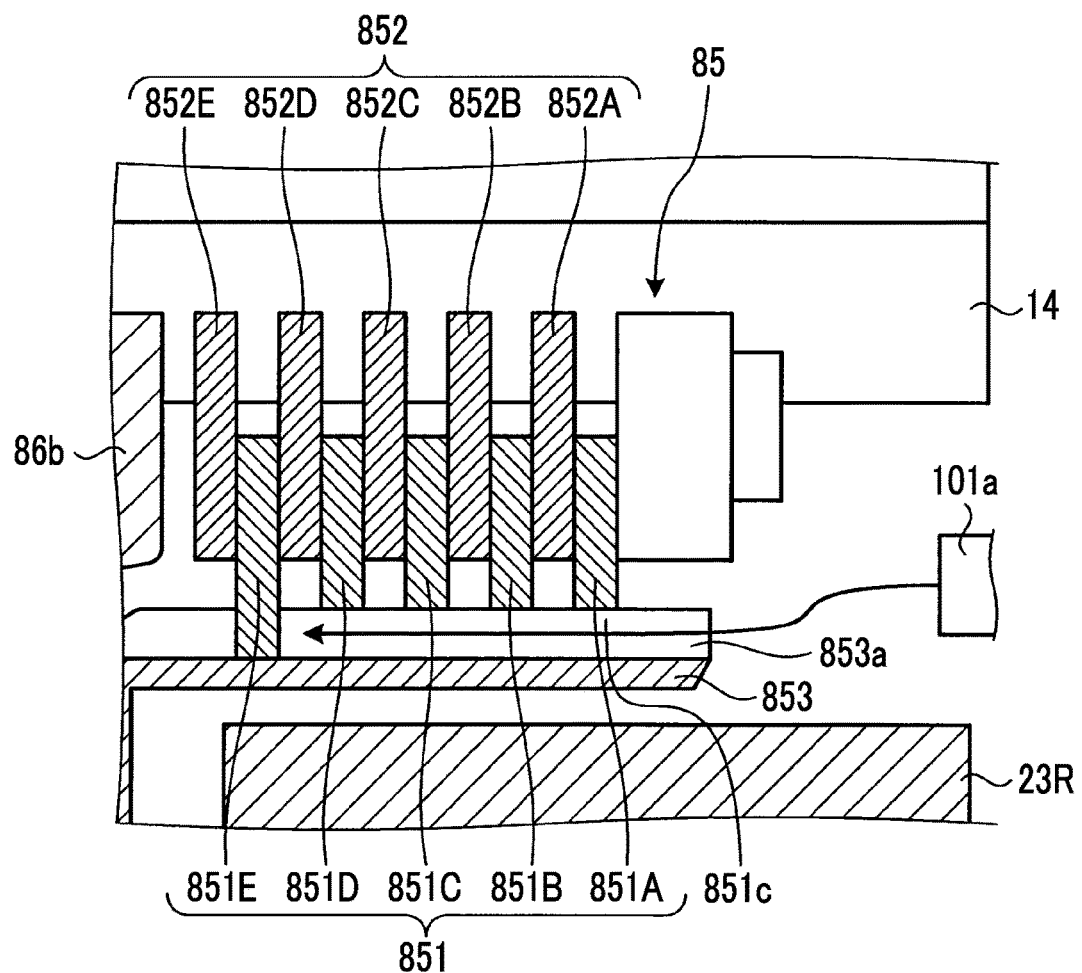
FIG. 8 is an enlarged sectional view of the friction engagement element included in the friction engagement device according to the embodiment.
Figure 9:
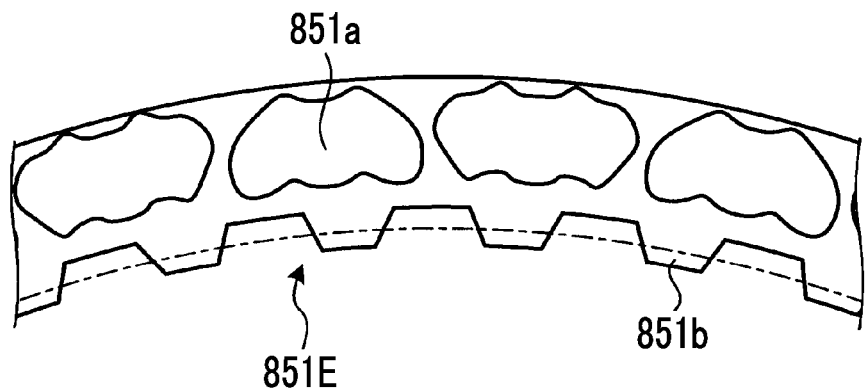
FIG. 9 is a plan view illustrating a first engagement member in which a toothless region is absent.
Figure 10:
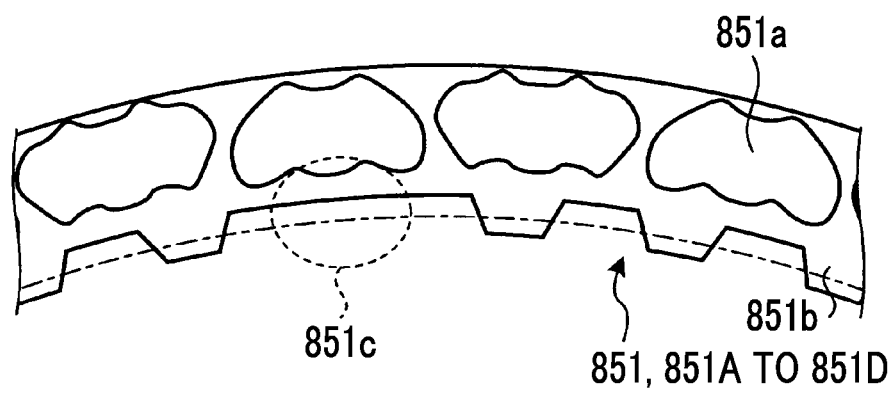
FIG. 10 is a plan view illustrating a first engagement member in which a toothless region is present.

The configuration of the second brake B2 forming the friction engagement device in the transmission according to the embodiment will be described. Each of FIGS. 5, 6, 7, and 8 is an enlarged sectional view illustrating the friction engagement element 85 of the second brake B2. FIGS. 9 and 10 are plan views respectively illustrating a case where a toothless region is not present in a first engagement member according to the embodiment and a case where a toothless region is present.

As illustrated in FIGS. 5 to 8, the friction engagement element 85 of the second brake B2 has a first engagement element 851 on a rotation side, a second engagement element 852 on a stationary side, and a fitting member 853. The first engagement element 851 is constituted by first engagement members 851A, 851B, 851C, 851D, 851E formed of, for example, a plurality of annular friction plates. The first engagement members 851A to 851E are sequentially arranged in order from the side of the extension 86b of the piston 86 so as to be movable along the direction of the rotation axis RC. The second engagement element 852 is constituted by second engagement members 852A, 852B, 852C, 852D, 852E formed of, for example, annular friction plates. The second engagement members 852A to 852E are sequentially arranged in order from the side of the extension 86b of the piston 86 so as to be movable along the direction of the rotation axis RC. The first engagement members 851A to 851E and the second engagement members 852A to 852E are arranged alternately along the direction of the rotation axis RC. The second engagement member 852A can be pressed by pressing the piston 86 via the extension 86b and is configured such that the first engagement element 851 and the second engagement element 852 can be engaged with each other. The first engagement member 851A may be configured to be pressed. The fitting member 853 has a substantially cylindrical shape and is constituted by a clutch hub rotating integrally with the input shaft 13 and a member rotating integrally with the rotating element of the planetary gear mechanism. The fitting member 853 in the embodiment is connected to the carrier 22C and is configured to be rotatable around the rotation axis RC. The inner circumferential portions (radially inner portions) of the first engagement members 851A to 851E are spline-fitted to spline teeth 853a as the outer teeth on the outer circumferential portion of the fitting member 853. Accordingly, the first engagement members 851A to 851E are configured to be rotatable around the rotation axis RC. The outer circumferential portions (radially outer portions) of the second engagement members 852A to 852E are spline-fitted to the casing 14 and fixed so as not to be rotatable. That is, the first engagement members 851A to 851E and the second engagement members 852A to 852E are configured to be rotatable relative to each other.

As illustrated in FIGS. 9 and 10, a friction material 851a for increasing the frictional force in the engaged state or the semi-engaged state is provided on the surfaces of the annular portions of the first engagement members 851A to 851E between the second engagement members 852A to 852E. As illustrated in FIG. 9, spline teeth 851b as inner teeth that can be fitted to the fitting member 853 are periodically provided along an annular circumferential direction on the inner circumferential side of the annular friction plate in the first engagement member 851E. The first engagement member 851E is a friction plate similar to a typical friction plate. On the other hand, as illustrated in FIG. 10, in the first engagement members 851A to 851D, while the spline teeth 851b that can be fitted to the spline teeth 853a of the fitting member 853 are provided on the inner circumferential side of the annular friction plate, a toothless region 851c (enclosed by a broken line) in which a portion where the spline teeth 851b are to be present is toothless is provided. The toothless region 851c is preferably provided periodically along the circumferential direction of the annular friction plate, but is not limited to being provided periodically.

Figure 5:
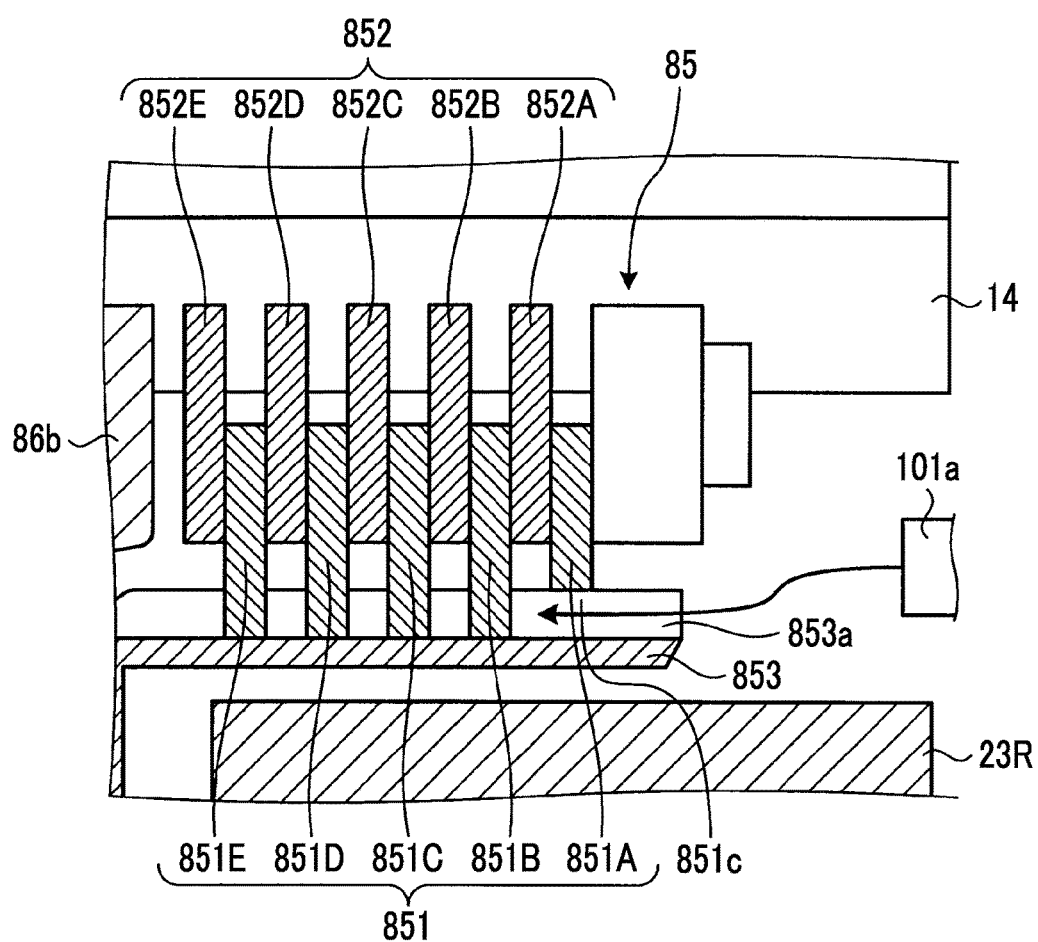
FIG. 5 is an enlarged sectional view of a friction engagement element included in a friction engagement device according to the embodiment.
Figure 6:
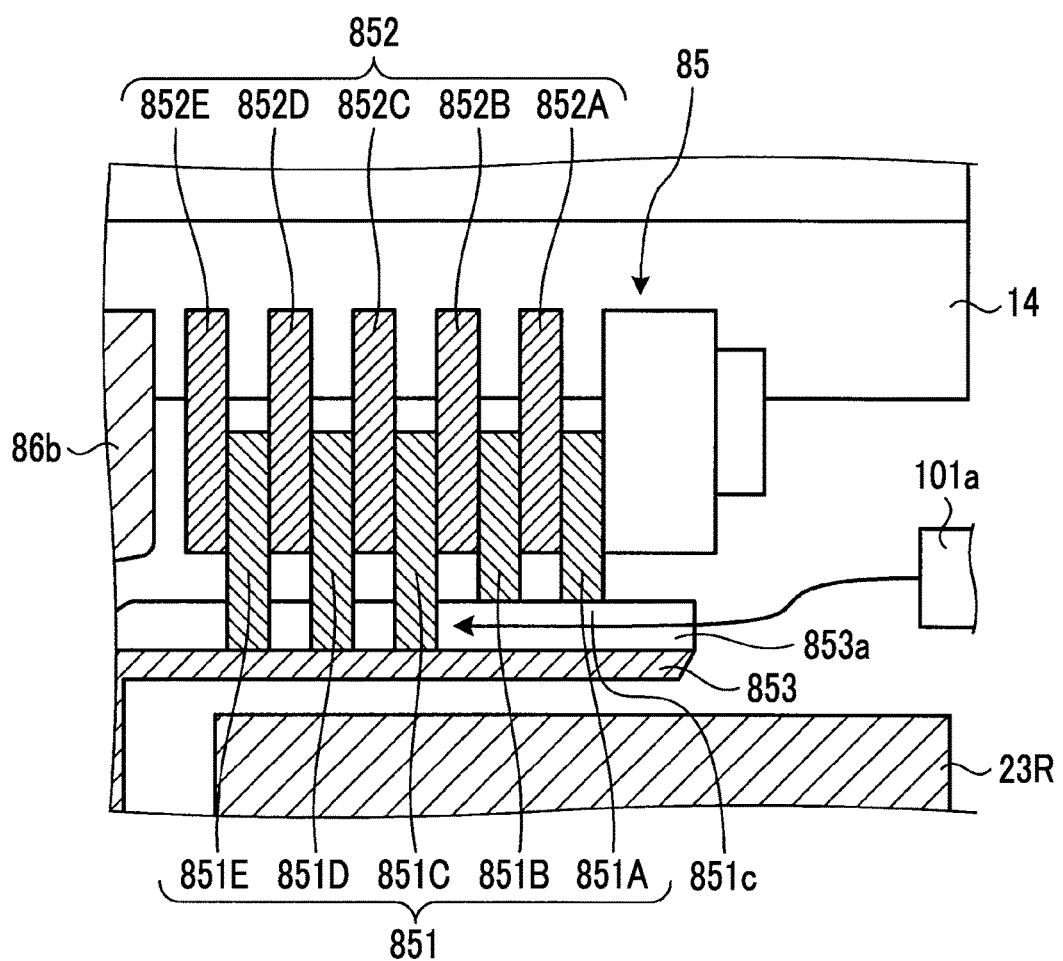
FIG. 6 is an enlarged sectional view of the friction engagement element included in the friction engagement device according to the embodiment.

In the embodiment, the number of toothless regions 851c is the largest in the first engagement member 851A, decreases in order of the first engagement members 851B, 851C, 851D, and becomes zero in the first engagement member 851E. FIG. 5 is a sectional view of a portion which becomes the toothless region 851c in the first engagement member 851A and becomes the spline teeth 851b in the first engagement members 851B to 851E, in the section of the friction engagement element 85. FIG. 6 is a sectional view of a portion which becomes the toothless regions 851c in the first engagement members 851A, 851B, and becomes the spline teeth 851b in the first engagement members 851C to 851E, in the section of the friction engagement element 85. FIG. 7 is a sectional view of a portion which becomes the toothless regions 851c in the first engagement members 851A to 851C, and becomes the spline teeth 851b in the first engagement members 851D, 851E, in the section of the friction engagement element 85. FIG. 8 is a sectional view of a portion which becomes the toothless regions 851c in the first engagement members 851A to 851D, and becomes the spline teeth 851b in the first engagement member 851E, in the section of the friction engagement element 85.

As illustrated in FIGS. 5 to 8, in the first engagement members 851A to 851D, as viewed from the annular front face, that is, from the discharge portion 101a side of the discharge nozzle 101, the positions of the toothless regions 851c along the circumferential direction are determined such that the toothless regions 851c are arranged in series as much as possible. That is, as illustrated in FIG. 8, in the portion in which the toothless region 851c is present in the first engagement member 851D closest to the extension 86b in the first engagement members 851A to 851D, as viewed from the discharge portion 101a side, the respective toothless regions 851c of the first engagement members 851A to 851C are positioned. Similarly, as illustrated in FIG. 7, in the portion in which the toothless region 851c is present in the first engagement member 851C closest to the extension 86b in the first engagement members 851A to 851C, as viewed from the discharge portion 101a side, the respective toothless regions 851c of the first engagement members 851A, 851B are positioned. Similarly, as shown in FIG. 6, in the portion in which the toothless region 851c is present in the first engagement member 851B closest to the extension 86b in the first engagement members 851A, 851B, as viewed from the discharge portion 101a side, the toothless regions 851c of the first engagement member 851A are positioned. Similarly, as shown in FIG. 5, in the portion in which the toothless region 851c is present in the first engagement member 851A, as viewed from the discharge portion 101a side, the spline teeth 851b of the first engagement members 851B to 851E are present.

As described above, by arranging the first engagement members 851A to 851E, the lubricating oil discharged from the discharge portion 101a is sequentially supplied to the first engagement members 851A to 851E. That is, the lubricating oil in the state illustrated in FIG. 5 passes through the toothless regions 851c of the first engagement member 851A and is supplied to the side closer to the extension 86b than the first engagement member 851A. The lubricating oil in the state illustrated in FIG. 6 passes through the toothless regions 851c of the first engagement members 851A, 851B and is supplied to the side closer to the extension 86b than the first engagement member 851B. The lubricating oil in the state illustrated in FIG. 7 passes through the toothless regions 851c of the first engagement members 851A to 851C and is supplied to the side closer to the extension 86b than the first engagement member 851C. The lubricating oil in the state illustrated in FIG. 8 passes through the toothless regions 851c of the first engagement members 851A to 851D and is supplied to the side closer to the extension 86b than the first engagement member 851D. Accordingly, the lubricating oil can be allowed to efficiently distribute to the first engagement member 851E and the second engagement member 852E at a position far from the discharge portion 101a of the discharge nozzle 101. Therefore, the insufficiency of the lubricating oil in the portions mentioned above can be suppressed, and the amount of the lubricating oil used for lubrication and cooling can be further reduced.

According to the embodiment described above, the lubrication switching valve 100 is provided radially outward of the second brake B2, the discharge nozzle 101 communicates with the lubrication switching valve 100 to cause the discharge portion 101a to be positioned radially outward of the fitting member 853, and the lubricating oil is supplied between the first engagement element 851 and the fitting member 853 from the discharge portion 101a. Accordingly, the planetary gear mechanism and the like are disposed radially inward of the second brake B2, and even in a case where a conduit for supplying the lubricating oil cannot be disposed, the lubricating oil can be efficiently supplied to the friction engagement element 85 of the second brake B2. Therefore, the insufficiency of the lubricating oil in the friction engagement element 85 can be suppressed, and the performance of cooling the friction engagement element 85 can be secured.

In the embodiment described above, in the first engagement members 851A to 851D, the toothless regions 851c in which the spline teeth 851b are absent are provided. Accordingly, the gap between the spline teeth 853a of the fitting member 853 in the toothless region 851c can be made relatively large, and it is possible to more reliably supply the lubricating oil to a member far from the portion from which the lubricating oil is supplied.

Modification Example of Embodiment

Figure 11:
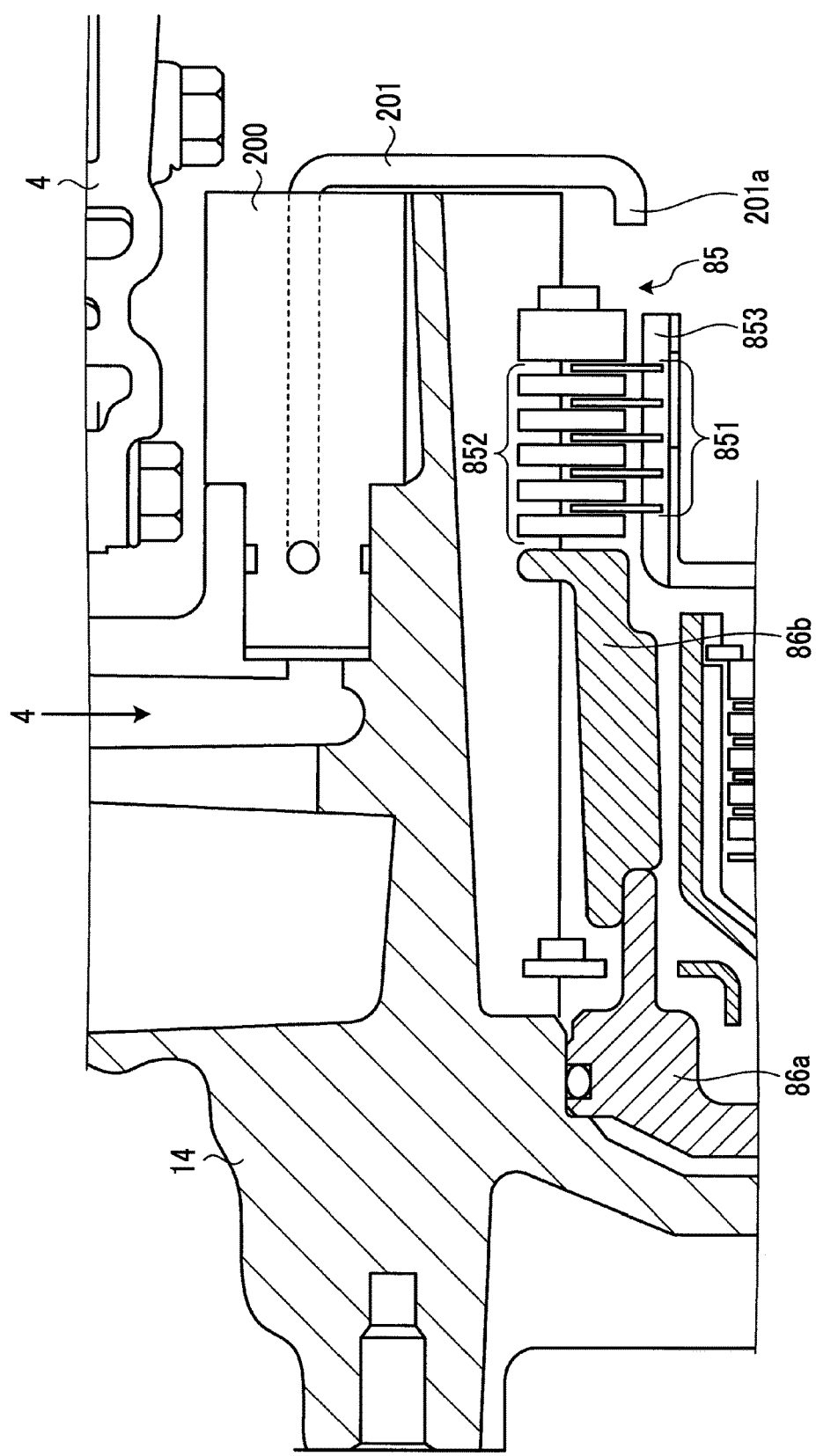
FIG. 11 is a sectional view illustrating a portion of a friction engagement device in a transmission according to a modification example of the embodiment.

A modification example of the embodiment described above will be described. FIG. 11 is a sectional view illustrating a portion of a friction engagement device in a transmission according to the modification example of the embodiment.

As illustrated in FIG. 11, in the transmission according to the modification example of the embodiment, unlike the embodiment, a solenoid valve 200 as the lubricating oil supply portion is provided instead of the lubrication switching valve 100. The solenoid valve 200 is controlled to be opened and closed by the ECU 10. That is, supply and cutoff of the lubricating oil to the friction engagement element 85 is controlled by the ECU 10. The other configurations are the same as those in the embodiment.

Control of the ECU 10 is performed as follows. That is, as described above, the first engagement members 851A to 851E are configured to be rotatable around the rotation axis RC. Therefore, in a case where the first engagement element 851 rotates, when viewed from a discharge portion 201a of a discharge nozzle 201 of the solenoid valve 200, the toothless region 851c appears in a portion of the arrangement of the spline teeth 851b along the circumferential direction of the first engagement member 851A. Here, the opening and closing control of the solenoid valve 200 is performed by the ECU 10, thereby adjusting the timing of supply and cutoff of the lubricating oil to the toothless region 851c of the first engagement member 851A. Specifically, at a timing at which the toothless region 851c passes through the vicinity of the discharge portion 201a, the solenoid valve 200 is opened to supply the lubricating oil from the discharge portion 201a, and at the preceding and succeeding timings, supply of the lubricating oil is cut off. As described above, by performing switching of the supply of the lubricating oil to the friction engagement element 85 using the solenoid valve 200, supply and cutoff of the lubricating oil can be switched at predetermined timings. Accordingly, it is possible to reduce the amount of the lubricating oil used for cooling and lubrication.

In a case where the first engagement element 851 and the second engagement element 852 are in the semi-engaged state or in a disengaged state after a lapse of the semi-engaged state, the calorific value in the friction engagement element 85 excessively increases, and cooling is needed the most. In such a case described above, while at least the first engagement element 851 and the second engagement element 852 are in the semi-engaged state or at a timing after the semi-engaged state, and preferably at a timing in the disengaged state after a lapse of the semi-engaged state, the ECU 10 controls the solenoid valve 200 to eject the lubricating oil through the discharge portion 201a. As described above, by performing switching of the supply of the lubricating oil to the friction engagement element 85 using the solenoid valve 200, supply and cutoff of the lubricating oil can be switched at predetermined timings. Accordingly, it is possible to reduce the amount of the lubricating oil used for cooling and lubrication. In a case of the semi-engaged state or the disengaged state after a lapse of the semi-engaged state, it is postulated that a large amount of the lubricating oil is needed. Therefore, the solenoid valve 200 may be controlled to be always opened by the ECU 10 to always supply the lubricating oil to the friction engagement element 85.

While the embodiment has been described in detail, various modifications based on the technical spirit can be made. For example, the numerical values mentioned in the embodiment are merely examples, and different numerical values may be used if needed.

For example, in the embodiment described above, the friction engagement device is exemplified by the second brake B2. However, it is possible to apply the friction engagement device to the first brake B1. Furthermore, it is also possible to apply the friction engagement device to the first to fourth clutches C1 to C4.

For example, in the embodiment described above, the toothless regions 851c in which the portion where the spline teeth 851b as the inner teeth are to be present is toothless are provided on the inner circumferential side of the first engagement members 851A to 851E. However, the embodiment is not limited to the configuration. For example, a toothless region in which the portion where the spline teeth 853a as the outer teeth are to be present is toothless may be provided on the outer circumferential side of the fitting member 853.

What is claimed is:

1. A transmission comprising:
a plurality of first engagement members, the first engagement member having an annular shape;
a fitting member having outer teeth spline-fitted to inner teeth of the first engagement members, the fitting member being configured to be rotatable around a predetermined rotation axis of the fitting member;
a plurality of second engagement members configured to be engaged with the first engagement members, the second engagement member having an annular shape;
a lubricating oil supply portion comprising a discharge nozzle configured to supply a lubricating oil to the fitting member;
and a transmission case configured to accommodate the first engagement members, the fitting member, the second engagement members, and the lubricating oil supply portion, wherein:
the lubricating oil supply portion is provided on an inner wall of the transmission case and an outer peripheral side of the first engagement members; and
the discharge nozzle of the lubricating oil supply portion which ejects the lubricating oil is configured to eject the lubricating oil toward a spline-fitted portion when the first engagement members and the fitting member are rotating, where the first engagement members and the fitting member are spline-fitted to each other.

2. The transmission according to claim 1, wherein:
the fitting member has a cylindrical shape in which the outer teeth are provided in an outer circumference; and
at least one planetary gear mechanism is disposed radially inward of the fitting member.

3. The transmission according to claim 1, further comprising an electronic control unit configured to control supply of the lubricating oil by the lubricating oil supply portion, wherein:
in the spline-fitted portion of the first engagement member, a portion of the inner teeth of the first engagement member has a toothless region; and
the electronic control unit is configured to cause the lubricating oil supply portion to eject the lubricating oil to at least the toothless region through the discharge portion.

4. The transmission according to claim 3, wherein a plurality of the toothless regions is disposed in the first engagement members such that the toothless regions are arranged along a direction of the predetermined rotation axis of the fitting member.

5. The transmission according to claim 3, wherein:
the first engagement members include close first engagement members close to the lubricating oil supply portion and far first engagement members farther from the lubricating oil supply portion than the first engagement members; and
the number of toothless regions included in the close first engagement members is larger than the number of toothless regions included in the far first engagement members.

6. The transmission according to claim 1, further comprising an electronic control unit configured to control supply of the lubricating oil by the lubricating oil supply portion,
wherein the electronic control unit is configured to cause the lubricating oil supply portion to eject the lubricating oil through the discharge portion while the first engagement members and the second engagement members are in a semi-engaged state and at a timing after the semi-engaged state.

* * * * *